Oct. 30, 1951     M. S. LIPMAN     2,573,207
LIQUID DISCHARGE MECHANISM

Filed June 6, 1946     2 SHEETS—SHEET 1

INVENTOR.
Maurice S. Lipman.
BY Charles S. Wilson
ATTORNEY.

Oct. 30, 1951      M. S. LIPMAN      2,573,207
LIQUID DISCHARGE MECHANISM
Filed June 6, 1946      2 SHEETS—SHEET 2

INVENTOR.
Maurice S. Lipman.
BY Charles J. Wilson
ATTORNEY.

Patented Oct. 30, 1951

2,573,207

UNITED STATES PATENT OFFICE 2,573,207

LIQUID DISCHARGE MECHANISM

Maurice S. Lipman, Hempstead, N. Y., assignor to Republic Aviation Corporation, Farmingdale, N. Y., a corporation of Delaware Application June 6, 1946, Serial No. 674,682

19 Claims. (Cl. 244—135)

This invention relates to means or mechanisms for the discharge of liquids from storage tanks or cells and, while it doubtless will find many varied general adaptations and uses, it is primarily designed and intended for use in conjunction with tanks or cells situated within the structural components, for example wings, fuselage, etc., of an aircraft for the storage of liquids, such as fuel, oil, water, etc., employed in its operation. Since this mechanism when inoperative closes and seals the opening through which the liquid is discharged and when operative opens the discharge opening, it may be considered a valve for the jettisoning of liquids from the storage tanks or tanks of an aircraft.

It is proposed that the present mechanism or valve may be operated to reduce the liquid contents of a tank or cell to a predetermined minimum and in so doing discharge or jettison the surplus liquid at a point removed or remote from the aircraft structure.

The instant invention contemplates the elimination of all pipes, tubes and/or fittings, heretofore sometimes employed for the dumping or jettisoning of liquids from tanks or cells within an aircraft structure, by including all functional and operating parts used in the jettisoning of liquids in the valve or discharge mechanism and at the same time obviate the necessity of relatively large apertures or openings in the skin of the aircraft structure and individually operable closures or doors therefore; thus producing an aerodynamically clean outer surface with no projections at the mounting of the valve or mechanism and generally reducing the weight of the mechanism or parts required for the jettisoning of liquids.

With the above and other objects in view, as will be apparent, this invention consists in the construction. combination and arrangement of parts all as hereinafter more fully described, claimed and illustrated in the accompanying drawings, wherein:

Figure 2:
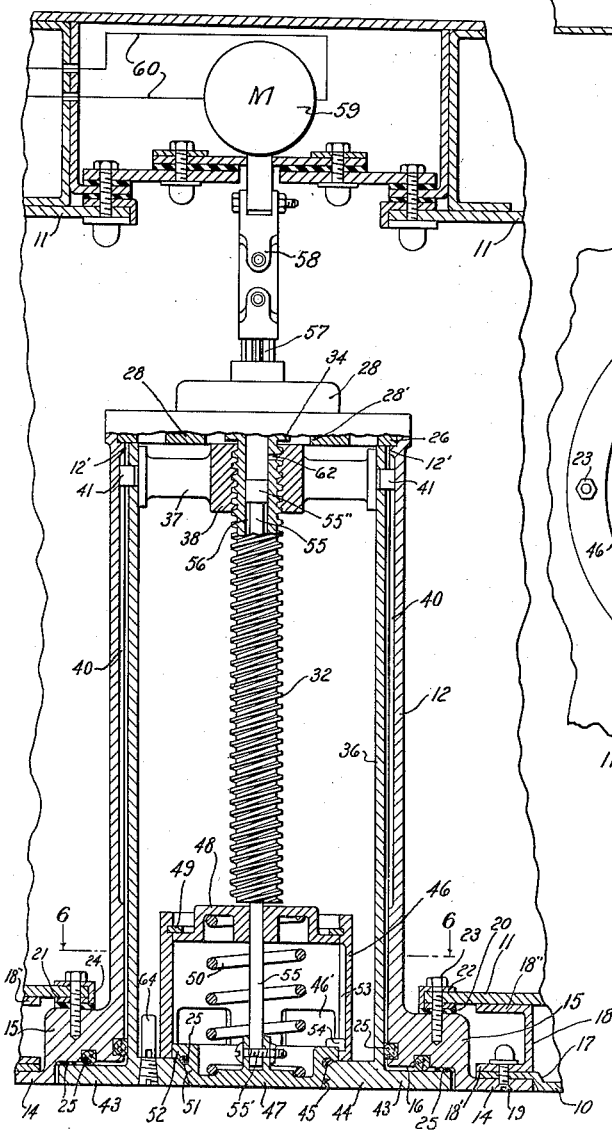
Fig. 2 is a vertical section through the skin of the wing, the tank therein contained and the present mechanism associated therewith to illustrate the parts of the latter in the relative positions they occupy when the mechanism is inoperative and the discharge opening is closed.
Figure 6:
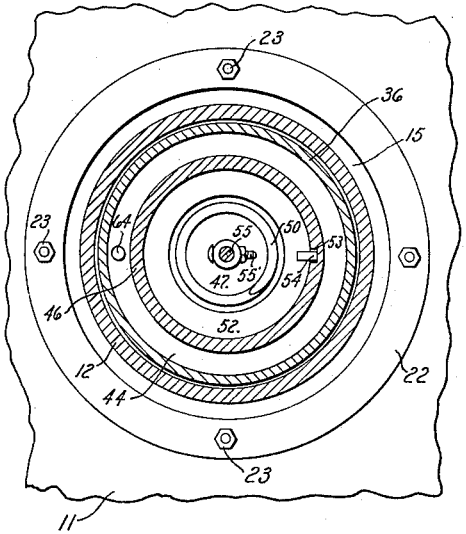
Figures 3, 4, 5:
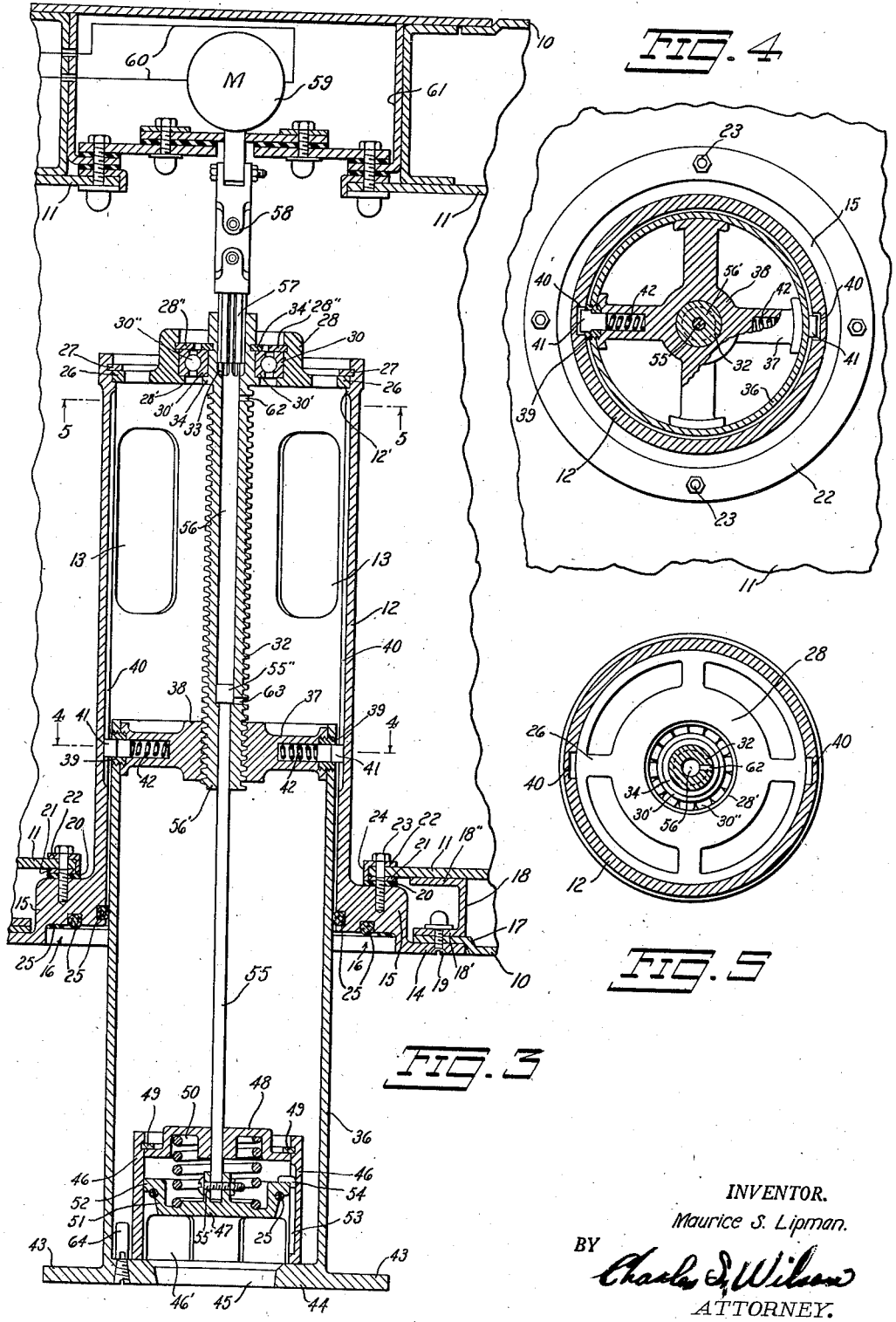

Fig. 3 is a section similar to Fig. 2 illustrating the relative positions assumed by the parts of the mechanism when the valve is operative to vent or jettison the liquid contents of the associated tank or cell, and illustrates the cooperation between the fixed valve casing or cylinder and the reciprocable extension tube mounted therein, as well as the means for operating the latter without rotation within the casing;

Fig. 4 is a horizontal section along line 4—4 of Fig. 3, to show the spider and collar at the upper end of the extension tube, its coaction with the drive employed for the reciprocation of the tube and the devices interposed between the fixed casing and the extension tube to counteract any tendency of the latter to rotate within the former;

Fig. 5 is a horizontal or transverse section along line 5—5 of Fig. 3 to disclose the mounting or bearing at the inner or upper end of the fixed casing and its cooperation with the jack shaft by which the extension tube is reciprocated; and Fig. 6 is a horizontal section along line 6—6 of Fig. 2 showing the relative arrangement of the fixed casing and the extension tube and the valve and cage located at the outer extremity of the latter.

Means to jettison or dump fuel or other liquids from containers or tanks within an aircraft are emergency equipment designed primarily to reduce the landing weight of the aircraft by reducing the volume and weight of the liquids carried or stored aboard the same. Heretofore, such means as have been employed for this purpose usually require large or elongated openings in the skin of the aircraft through which may be swung or projected a pipe or pipes associated with valves, interconnecting pipes and other fittings communicating with the storage cells or tanks within the structure. To produce an aerodynamically clean structure, doors or closures must be provided for these relatively large openings and these doors or closures are controlled or regulated by operating mechanisms. These operating mechanisms, as well as the additional mechanisms for the adjustment of the pipe or pipes to be projected from the aircraft structure and those for the manipulation of the several valves necessary for the initiation and control of the discharge of liquids stored in tanks within the aircraft structure, together with all of the pipes, valves, fittings, and other accessories associated together to form the jettisoning or dumping mechanism, comprise a complicated and cumbersome system subject in all and every of its components to mechanical, hydraulic or electrical failure and adding greatly to the dead weight of the aircraft.

The present invention proposes a single dump or jettison valve for each tank within the aircraft structure having a single or individual operating mechanism by which a discharge or extension tube is projected beyond the limits of the associated aircraft structure for the purpose of conducting all surplus liquid over a predetermined minimum quantity from a tank within the structure to a point removed or remote therefrom. It is contemplated by the instant mechanism to close the pipe or discharge tube by a valve during the major portion of its travel and to open this valve as the tube or pipe approaches or reaches the limit of its outward or projecting movement.

While the present mechanism is described and shown as individual to each tank within the aircraft structure, it is to be understood that a single mechanism or valve may be provided for the jettisoning of the surplus fluids in several tanks by being suitably connected through pipes or other conduits with the several tanks of a series within the structural components of the aircraft.

Reference being had more particularly to the drawings 10 designates the skin of a structural component of an aircraft, such as wing or fuselage, in which is housed and mounted a tank or cell 11 to contain fuel, oil, or other liquid. Since the structure and nature of the component per se, or of the tank, form no part of this invention but merely comprise the environment thereof they are schematically indicated in the drawings. It will become manifest that the present invention will readily cooperate with any type of tank or cell situated and contained within any rigid structural component of an aircraft and will be applicable as readily to an integral tank defined and created by and within the elements combining to produce such structural component as to a collapsible cell or rigid metal tank housed within any hollow aircraft part. In short the present valve or mechanism will coact with the tank whether it be integral with the structural component or a unit independently fabricated of metal or flexible material and subsequently housed within and surrounded by a component part of the aircraft. As an example the present invention is illustrated in conjunction with a collapsible cell.

The fixed or stationary main casing of the present mechanism or valve is generally cylindrical and extends upwardly from an aperture in the skin 10 to a point within the tank 11, the wall thereof being pierced near its upper end by a series of openings 13 here shown as being somewhat elongated in the direction of the axis of the casing. For the support of the casing 12 and its attachment to the skin 10, as well as to the wall of the tank 11, it is provided at its outer or lower end with an outstanding attaching flange 14. This flange 14 may be formed integrally with the casing 12 and have a relatively thick boss or shoulder 15 situated between it and the casing and overlying a recess 16 encircling the outer extremity of the casing 12 and located generally in the plane of the flange 14. The boss 15 in turn may be formed integrally with the casing 12 or attached thereto in any suitable manner to project above the inner face of the flange 14 at and concentric to the aperture in the skin in alignment with the casing 12.

The skin 10 of the aircraft component defining the discharge aperture therein is depressed inwardly, as at 17, thereby producing a seat for the reception of the flange 14, the depth whereof is such that the outer face of the flange when seated under the depression 17 rests in the plane of the outer surface of the skin 10. To secure the flange 14 to the skin the depressed portion 17 of the latter rests over and flush against the inner face of the flange where it is clamped and held by the lower arm or side 18' of an annular U-ring 18 seated upon and secured to the flange 14 by the countersunk bolts or other suitable fastening means 19 passing through the flange 14, the skin 10 and the arm 18' of the U-ring 18. Thus the main casing or cylinder 12 of the valve is secured to and supported by the skin 10 of a structural aircraft component to extend inwardly thereof through registering apertures in the skin 10 and wall of the tank 11 and terminate within the upper part of the tank.

Since the casing or cylinder 12 projects through an opening in the wall of the tank 11 it is desirable, if not entirely necessary, to sealingly secure the edge of the wall defining this opening to the casing 12 and at the same time protect the raw edge of the material of the tank wall. To that end a gasket 20 of rubber or other suitable material rests upon the upper or inner surface of the shoulder or boss 15 and has a flat base ring 21 disposed thereon. The edge of the aperture in the wall of the tank or cell 11 is positioned over the base ring 21 and is there held by a clamping ring 22, the entire assembly being secured together in clamping and sealing cooperation by bolts 23 piercing the rings 21 and 22, the gasket 20 and the edge of the wall of the tank 11 to be threaded into sockets provided for that purpose in the boss or shoulder 15. It will be observed that the upper arm or side 18'' of the U-ring 18 is situated under and supports the wall of the tank or cell 11 adjacent to its engagement by the clamping assembly 15—20—21—22 and thus prevents or counteracts any buckling or distortion thereof which might tend to rupture the wall at that point or create an outward and downward pull on the wall 11 at its junction with the casing 12. To protect the raw edge of the material of the tank wall the clamping ring 22 is provided with a lip 24 at one of its edges which extends over and covers the edges of the tank wall and the base ring 21 and bears against the gasket 20. This assembly not only secures the tank wall to the shoulder or boss 15 of the casing 12 and protects the edge of the material of the tank from the fluid contents thereof but also effectively seals the connection between the tank wall and the casing 12. In this manner and by this means the main casing or cylinder 12 is not only supported by and secured to the skin 10 of an aircraft component but it is so passed through the wall of the tank 11 that any tendency of the contents of the tank to leak at that point is counteracted and overcome.

The upper or inner end of the casing 12 supports a concentric bearing 28 fixedly carried by a spider 26 resting on a shoulder 12' projecting inwardly adjacent the upper end of the casing 12 and formed integrally with the casing wall preferably by increasing the inner diameter of the casing above the point where the shoulder is situated. The spider and bearing 28 are held in position in the extremity of the casing 12 and against the shoulder 12' by a snap ring 27 engaged in a groove in the inner face of the casing wall above the shoulder and bearing over the periphery of the spider. By supporting the bearing 28 on the spider 26 apertures are provided for the free and unobstructed passage of liquid from the tank 11 to the interior of the casing 12.

An externally threaded shaft 32 extends centrally and longitudinally through the casing 12 and at its upper end is provided with a splined socket 33. The socketed end 33 of the shaft 32 is situated in the bearing 28 and is provided with an external shoulder 34 adjacent or in transverse alignment with the inner end of the socket 33 which abuts against and supports one side 30' of a ball race assembly 30—30' interposed between the shaft 32 and the bearing 28, the complemental side 30 thereof being carried by the bearing 28. The ball race 30' is secured to the shaft 32 and against the shoulder 34 by a snap ring 34' seated in a groove formed in the outer surface of the shaft parallel to the shoulder 34. The bearing 28 is provided with a shoulder 28' in substantial horizontal alignment with the shoulder 34 of the shaft 32 upon which rests the race 30 to be there held by the snap ring 28'' seated in a groove in the bearing 28 spaced from and parallel to the shoulder 28'. Between the races 30—30' are located a series of standard anti-friction members 30'' which may be either balls or rollers. Thus the socketed end of the shaft 32 may rotate freely and easily in the bearing 28 of the spider 26 which is fixed to the upper or inner end of the stationary casing 12 of the assembly.

An extension tube 36 is concentrically mounted for longitudinal reciprocation within the casing 12 and its position with respect to the latter is controlled and determined by the externally threaded jack shaft 32. For that purpose at the upper or inner end of the tube 36 is situated a spider 37 fixedly carrying and supporting a concentric internally threaded collar 38 through which the shaft 32 operates, the external threads of the shaft 32 coacting with the internal threads of the collar to vary the position of the spider 37 with respect to the shaft upon the rotation of the latter in either direction. This spider 37 is fixedly secured to the inner end of the tube 36 in any suitable manner, as, for example, by the externally threaded plugs 39 piercing and threaded to both the arms of the spider 37 and to the tube 36. As the shaft 32 is rotated in either direction in the bearing 28 the cooperation of the threads of the shaft and those of the collar 38 causes the spider 37 to travel in a direction either inwardly or outwardly on the shaft and thereby correspondingly move the tube 36 inwardly or outwardly of the casing 12.

In order to prevent any rotation of the tube 36 within the stationary casing 12 as the shaft 32 rotates, the interior of the casing is provided with the longitudinal grooves 40, a groove being aligned with the outer end of each radial arm of the spider 37. Mounted for reciprocation in the outer end of each arm of the spider 37 and in the plug 39 thereof is a plunger 41 which is maintained in sliding engagement with the corresponding groove 40 of the casing 12 by a spring 42 housed in a passage within the arm of the spider 37 and pressing against the inner end of the plunger 41. By this means the inner end of the reciprocable extension tube 36 is secured for sliding movement relative to the casing 12 and is, at the same time, held against any rotary movement with respect to the casing 12. The rotation of the shaft 32 in one direction, because of the threaded engagement between it and the central collar 38 of the spider 37, projects the tube 36 from the outer end of the casing 12 (Fig. 3) while its rotation in the reverse direction retracts the tube into the casing 12 (Fig. 2).

Figure 1:
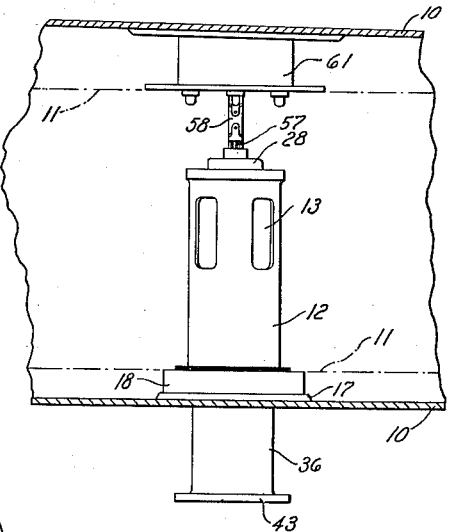
Fig. 1 is a sectional view through the skin of an aircraft wing showing the outline of a tank or cell contained therein in broken lines and the present invention in elevation adjusted to jettison the liquid contents of said tank.

In this manner and by these means the tube 36 may be projected from the casing 12 and beyond the skin 10 surrounding the outer extremity of the casing 12 or it may be retracted so that the outer extremity thereof rests flush with the skin 10 surrounding the outer extremity of said casing. When the tube 36 is projected as shown in Figs. 1 and 3 the fluid within the tank 11 above the level of the slotted openings 13 in the casing 12 flows into the casing 12 and the tube 36 to be discharged from the outer extremity of the latter.

This jettisoning discharge of the liquid from within the tank 11 is into the air stream and the discharged liquid should be so released from the tube 36 that it will not spray over or contact any component or part of the aircraft. To that end the tube 36 is projected beyond the surface of the skin 10 a distance sufficient to insure the release of the liquid into the air stream without its contacting any part of the aircraft. Thus the length of the tube 36, when fully projected, as shown in Figs. 1 and 3, is such that the release or discharge of the jettisoned liquid into the airstream or into the wash of the propeller will not result in its distribution over any part of the aircraft or its delivery into the exhaust of the engine.

At its outer end the extension or discharge tube 36 is provided with an outstanding flange 43 which, when the tube 36 is retracted and situated entirely within the casing 12, is located in the concentric depression 16 defined by the outer face of the shoulder 15 and the flange 14 at the outer end of the casing 12 as above described. By this means, the outer extremity of the tube 36 and its associated parts when the tube 36 is fully retracted are flush with the outer surface of the flange 14 carried by the casing 12 and with the skin 10 of the aircraft component containing the tank or cell 11 with no part thereof projecting beyond the surface of the skin.

A flange 44, coplaner with the external flange 43 at the outer extremity of the tube 36, projects inwardly of the tube 36 and defines an outlet or discharge opening 45. This flange 44 supports a valve cage 46 on its inner surface in which is mounted a valve 47 movable within the cage to and from the discharge opening 45. The openings 46' in the wall of the cage 46 permit the liquid in the casing 12 and the tube 36 to pass through the outlet or discharge opening 45 when the latter is free of the valve 47 as illustrated in Fig. 3. At its inner end the cage is provided with a closure 48 held in place by a snap ring 49 to constitute an abutment for one end of a coil spring 50 the opposite end of which abuts against the inner surface of the valve 47. This spring 51 when free to operate seats the valve 47 in the discharge opening 45 at the outer end of the tube 36 with its outer face coextensive with the outer surfaces of the flanges 43—44—14 and with the skin 10 of the aircraft component. To provide a seat for the valve 47 and to insure its being positioned in perfect alignment with the flanges as aforesaid when closing or sealing the discharge opening 45, the periphery of the valve is provided with an inwardly projecting lateral flange 51 terminating in an outstanding horizontal flange 52 lying in a plane parallel to that of the valve. As illustrated in Fig. 2 horizontal flange 52 carried by the flange 51 rests upon the inner surface of the flange 44 when the valve 47 closes or seals the discharge opening 45. For the purpose of preventing any rotary movement of the valve 45 within the cage 46, as it moves toward or away from its seat, the inner face of the cage is provided with one or more longitudinal grooves 53 between the openings 46' for the reception of an ear or ears 54 fixed to and carried by a part of the valve, such as the flange 52, and projecting horizontally beyond the limits of the valve.

To operate the valve 47 against the pressure of the spring 50, a stem 55 is secured concentrically to the inner face of the valve by any suitable means 55' and passes and reciprocates through the center of the closure 48 at the upper end of the cage 46. Throughout its length, i. e. from the inner end of the socket 33 to its inner extremity, the shaft 32 is provided with a central or concentric passage 56 which is reduced in diameter in correspondence with the inner end portion of the shaft to create an internal shoulder 56' in the shaft adjoining its inner or lower end. The stem 55 of the valve 47 passes through this shoulder 56' into the passage 56 of the shaft 32 and above said shoulder is provided with a head 55" having a diameter about equal to that of the passage 56 and greater than the diameter of the opening through the shoulder 56' for the passage of the stem. Since the valve 47 and its cage 46 and the stem 55 travels with the tube 36 in its movement longitudinally of the casing 12, the head 55" of the stem 55 reciprocates within the passage 56 and its shoulder 56' of the shaft 32, as the shaft by being rotatingly secured to the casing 12 remains bodily stationary relative to the casing 12 as well as to the spider 37 carried by the tube 36.

Thus as the tube 36 is projected from the casing 12, as shown in Figs. 1 and 3, the valve 47 remains seated in the discharge opening 45 under the influence of the spring 50 until the head 55" of the stem 55 contacts with the shoulder 56' created by the reduction in the passage 56, whereupon the movement of the stem 55 with the extension tube 36 is arrested and the continued movement of the tube 36 causes the stem 55 to lift the valve 47 out of the discharge opening 45 against the action of the spring 50. Reversely as the tube 36 is retracted into the casing 12 the departure of the head 55" of the stem 55 from the internal shoulder 56' of the shaft 32 allows the pressure of the spring 50 to return the valve 47 to the discharge opening 45, thereby effectively closing it to the passage of liquid. By this means the projection of the tube 36 from within the casing 12 does not initially permit the discharge of any liquid from the tank 11 until the outer end of the tube approaches the extreme outer limit of its path movement whereupon the valve 47 is automatically lifted by arresting of the movement of the stem 55 to permit the discharge of liquid through the opening 45. Reversely, the return movement of the tube 36 to its retracted position within the casing 12 initially causes the valve 47 to be seated in the discharge opening 45.

For the rotation of the shaft 32 a splined stud 57 is received in the splined socket 33 in the upper end of the shaft and is connected by universal drive 58 to a reversible motor 59. This motor 59 may be an electric motor which can drive the shaft 32 in either direction and is controlled by a circuit 60 leading to any appropriate position within the fuselage of the aircraft. As the motor 59 and the electrical connections 60 form no part of the present invention, they are schematically illustrated herein. Manifestly any suitable means can be employed for the rotation of the jack shaft 32 in either direction; even a manually operated crank may be used. To protect the motor 59 from the liquid within the cell or tank 11 and to prevent leakage of liquid from the tank, a housing 61 surrounds the motor and is sealed to the tank 11 against the passage of the liquid from the tank not only into the housing but into the space surrounding the tank. While this housing 61 preferably is mounted within the aircraft component 10 and exteriorly of the cell or tank 11, it may be positioned within the tank 11 if appropriate precautions are taken to fully protect the motor 59 from the liquid within the cell or tank.

To prevent leakage of the liquid within the cell or tank 11 prior to its intentional discharge through the tube 36 and also to prevent leakage between the moving parts of the instant mechanism suitable seals or packing glands 25 of any standard or accepted form and material are provided at all points where leaks can be anticipated or expected.

From the foregoing, it is evident that the present mechanism in effect constitutes an extensible valve by which the fluid contained within the tank 11 may be freely discharged and its discharge so controlled that the aircraft and its components will be protected from the liquid being discharged.

One of the ends attained by the present invention is the reduction of the landing weight of an aircraft carrying a full fuel load. Under these emergency circumstances, the practice is to jettison all fuel above a minimum required for the landing of the plane and its operation and maneuvering shortly thereafter. Hence the present mechanism only jettisons that part of fuel within the tank 11 above the lower extremities of the slots or apertures 13 in the casing 112. Thus when the tube 36 is projected to the position shown in Fig. 3, that portion of the liquid within the tank 11 and situated above the lower ends of the slots or opening 13 in the casing 12 will flow through these openings into the casing 12 around the spokes of the spider 37, into the tube 36, through the openings 46' of the cage 46 and out of the discharge opening 45. When the level of the liquid within the tank reaches the lower ends of the slots or openings 13, the discharge of the liquid ceases regardless of the position of the tube 36 or of the valve 47. Since only that portion of the liquid in the tank 11 above the level of the openings 13 in the casing 12 and/or above the upper end of the casing is ultimately jettisoned or discharged upon the projection of the extension tube 12, the quantity of jettisoned liquid is determined by the position of these openings and by the length of the casing 12 and can, of course, be varied by relocating these openings and/or by changing the length of said casing.

In order to prevent any accumulation of liquid in the passage 56 of the shaft 32 from interfering with the free, unimpeded reciprocation of the stem 55 and its head 55" a vent hole 62 is provided in the shaft 32 adjoining the inner end of the socket 33 and a similar hole 63 is situated adjacent and above the internal shoulder 56' formed at the lower end of the shaft. Thus the head 55" of the stem 55 is moving upwardly in the passage 56 forces all liquid between it and the inner end of the socket 33 outwardly through the upper hole 62 and in moving downwardly in the passage 56 expels all liquid in said passage between it and the shoulder 56' at the inner or lower extremity of the shaft 32 through the lower hole 63.

It may be that on occasion it will be desirable to drain the extension tube 36 and for that purpose a drain 64 of any suitable construction and design is mounted on and pierces the flange 44 at the outer end of the extension tube 36.

While the present mechanism finds its primary use in conjunction with the liquid storage tanks or cells of an aircraft it is manifest that it will have many other uses and adaptations. It will also be evident from the foregoing that the details of construction and of assembly can be changed and varied or other specific means substituted for those shown and described herein as being the preferred construction, without departing from the spirit and scope hereof.

What is claimed is:

1. The combination with a stationary casing associated with a liquid container, of an extension tube, having its outer end open, mounted for reciprocating movement inwardly and outwardly of said casing and arranged to constitute a continuation of said casing when projected outwardly thereof, remotely controlled means for moving said tube in either direction longitudinally of the casing, a valve positioned in the open outer end of said tube, and means associated with and controlled by said means for moving the extension tube relative to said casing for opening said valve.

2. The combination with a stationary casing, of an extension tube, having its outer end open, mounted for reciprocating movement inwardly and outwardly of said casing, a valve normally closing the open outer end of said tube, mechanical means for moving said tube as aforesaid, and means associated with and operable by said mechanical means for automatically opening said valve as the tube approaches the limit of its movement outwardly of the casing.

3. The combination with a stationary casing, of an extension tube open at both of its ends mounted within said casing for reciprocation inwardly and outwardly thereof, a spring actuated valve normally closing the outer end of said tube, remotely controlled mechanical means for reciprocating said tube as aforesaid, and means for operating said valve against the action of said spring, said means being controlled by said mechanical means upon the outward movement of said extension tube.

4. The combination with a stationary casing, of a tube mounted within said casing for movement outwardly and inwardly thereof, a valve normally closing said tube, operating means for reciprocating said tube within said casing, and means under the control of said operating means for opening said valve as the tube approaches the limit of its outward movement.

5. The combination with a stationary casing, of a tube mounted within said casing for movement outwardly and inwardly thereof, a valve normally closing said tube, operating means for reciprocating said tube within said casing, and means associated with and controlled by said operating means to open said valve as the tube approaches the limit of its outward movement and permit the return thereof to its normal position upon the movement of the tube inwardly of the casing.

6. The combination with a stationary casing, of a movable tube mounted for reciprocation within the casing, a reversible operating means carried by said tube and associated with said operating means to move said casing, a driving connection carried by said tube outwardly or inwardly of said casing, a closure for said tube, and means carried by the tube and cooperating with said operating means for opening said closure at approximately the limit of the outward movement of the tube.

7. The combination with a stationary casing, of a movable extension tube mounted for reciprocation in said casing, a threaded jack shaft mounted for rotation in said casing and having a longitudinal passage therein, a collar fixed to said tube and internally threaded for cooperation with the threads of said jack shaft, a valve positioned for closing the outer extremity of said tube, a spring operating against said valve for holding it in its closed position, a stem secured to said valve extending into the passage of the shaft, a head on said stem contained within and reciprocable in said passage, an inner shoulder adjoining one end of the shaft for contact with said head as the tube and stem move in unison in one direction, and means for rotating said shaft in either direction.

8. The combination with a liquid container enclosed within a structural component of an aircraft, said container and component having aligned outlet openings, of a stationary casing situated in cooperation with said openings and extending into said container, an extension tube mounted for axial movement with respect to said casing to be projected beyond or retracted within the limits of said component, operating means positioned within the container and coacting with said tube for the movement thereof relative to the casing, a valve for normally closing said tube, and means under the control of the operating means for opening said valve upon the projection of said tube.

9. The combination with a liquid container enclosed within a structural component of an aircraft, said container and component having aligned outlet openings, of a stationary casing situated in cooperation with said openings and extending into said container, an extension tube mounted for axial movement with respect to said casing to be projected beyond or retracted within the limits of said component, a rotary shaft within said container, a driving connection between said shaft and said tube whereby the rotation of the shaft axially moves the tube as aforesaid, a spring actuated valve mounted in and normally closing said tube, a stem secured to said valve at one of its ends and having sliding engagement with the shaft at its opposite end, and means associated with said stem and said shaft for exerting a pull on the stem to lift the valve against the action of the spring upon the tube reaching a predetermined point in its projecting movement.

10. The combination with a hollow aircraft component having a skin housing a liquid container, said skin and container being provided with aligned outlet openings, of a stationary casing principally housed within said container and positioned in said aligned openings, means for sealingly connecting the container wall to said casing, means for securing the outer end of the casing flush with the outer surface of the skin, and means normally contained within the casing and projectable therefrom for conducting liquid from the casing to a point beyond the skin and for there releasing it.

11. The combination with a hollow aircraft component having a skin housing a liquid container, said skin and container being provided with aligned outlet openings, of a stationary casing positioned in said aligned openings and situated principally within the container, an outstanding flange at the outer end of said casing located coextensive with the outer surface of said skin, means for securing the flange to support and mount said casing, and means normally housed within said casing to be projected therefrom for conducting liquid from said container to a point remote from the skin and there discharge it.

12. The combination with a hollow aircraft component having a skin housing a liquid container, said skin and container being provided with aligned outlet openings, of a stationary casing positioned in said aligned openings and terminating within the container, an outstanding flange at the outer end of said casing provided with a shoulder on its inner face overlying a recess in its outer face, means for securing the edge portion of said flange to the skin with its outer face in the plane of the outer face of the skin, means for sealingly securing the wall of the container to said shoulder, a tube mounted for protraction and retraction in said casing, a flange traversing the extremity of the tube, that portion thereof exterior of the tube being received in the recess aforesaid upon the retraction of the tube, a valve supported by that portion of the flange interior of the tube, means for maintaining said valve normally closed, and means for opening said valve upon the protraction of the tube.

13. The combination with a hollow aircraft component having a skin housing a liquid container, said skin and container being provided with aligned outlet openings, of a stationary casing positioned in said aligned openings and terminating within the container, an outstanding flange at the outer end of said casing provided with a shoulder on its inner face overlying a recess in its outer face, means for securing the edge portion of said flange to the skin with its outer face in the plane of the outer face of the skin, means for sealingly securing the wall of the container to said shoulder, a tube mounted for protraction and retraction in said casing, a flange traversing the extremity of the tube, that portion thereof exterior of the tube being received in the recess aforesaid upon the retraction of the tube, a valve cage supported on that portion of the flange interior of the tube, a valve within said cage, a spring operating on said valve for normally closing the outlet end of the tube, means for reciprocating said tube within the casing, and means for lifting the valve against the action of the spring at approximately the outward limit of the movement of the tube.

14. The combination with a hollow aircraft component having a skin housing a liquid container, said skin and container being provided with aligned outlet openings, of a stationary casing positioned in said aligned openings and terminating within the container, an outstanding flange at the outer end of said casing provided with a shoulder on its inner face overlying a recess in its outer face, means for securing the edge portion of said flange to the skin with its outer face in the plane of the outer face of the skin, means for sealingly securing the wall of the container to said shoulder, a tube mounted for protraction and retraction in said casing, a flange traversing the extremity of the tube, that portion thereof exterior of the tube being received in the recess aforesaid upon the retraction of the tube, a valve cage supported on that portion of the flange interior of the tube, a valve within said cage, a spring operating on said valve for normally closing the outlet end of the tube, an externally threaded hollow jack-shaft mounted for rotation concentrically within said casing and having the passage therein reduced to form an internal shoulder at the end of said shaft, a stem fixed to said valve to reciprocate bodily with said tube and projecting into the passage of said shaft, a head on the stem situated within the shaft passage for contact with the shoulder within the end of the passage, and a threaded connection between the shaft and the tube whereby the rotation of the shaft in either direction correspondingly reciprocates the tube and stem within the casing.

15. The combination with a hollow aircraft component housing a liquid containing cell, of means for jettisoning liquid from within the cell comprising a discharge tube mounted for reciprocation from within the cell to a position projecting from and terminating beyond the surface of the component, a valve normally closing said tube, remotely controlled means for reciprocating said tube in either direction, and means for automatically opening said valve as and when the tube reaches its fully projected position.

16. The combination with a hollow aircraft component housing a liquid containing cell, of means for jettisoning liquid from within the cell comprising a discharge tube mounted for reciprocation from within the cell to a position projecting from and terminating beyond the surface of the component, a valve normally closing said tube, and means for opening said valve approximately concurrently with the tube reaching its extreme projected position.

17. The combination with a hollow stationary casing, of an extension tube mounted within the casing for reciprocation longitudinally thereof, a threaded shaft carried by and extending concentrically into the casing, means for rotating said shaft in either direction, a connection associated with one end of the extension tube and having operative connection with the threads of said shaft whereby the rotation of the shaft moves the tube within the casing in a direction corresponding to the direction of the rotation of the shaft, a valve situated to normally close the outer extremity of the tube, and means for opening said valve under the control of the shaft aforesaid.

18. The combination with a hollow stationary casing, of an extension tube mounted within the casing for reciprocation longitudinally thereof, a threaded shaft carried by and extending concentrically into the casing, means for rotating said shaft in either direction, a connection associated with one end of the extension tube and having operative connection with the threads of said shaft whereby the rotation of the shaft moves the tube within the casing in a direction dependent upon the rotation of the shaft, a spring-loaded valve normally closing the outer extremity of said tube, and means attached to said valve and associated with the shaft aforesaid to open the valve against the action of its spring at the approximate outer limit of the movement of said tube.

19. The combination with a stationary cylindrical casing, a threaded shaft concentric to said casing and carried thereby, said shaft having a shouldered passage therein, an extension tube mounted for reciprocation within said casing, a spider fixed to one end of said tube and having threaded engagement with the shaft aforesaid, means for rotating said shaft in either direction thereby moving said tube within and inwardly or outwardly of the casing, a spring loaded valve normally closing the outer end of said tube, and a valve rod attached to said valve and projecting into the passage of the shaft aforesaid, said valve rod having a head mounted for reciprocation within the passage of the shaft and adapted to abut the shoulder thereof when the tube reaches the approximate outer end of its path of movement to thereby lift the valve aforesaid against the action of its spring.

MAURICE S. LIPMAN.

REFERENCES CITED

The following references are of record in the file of this patent:

UNITED STATES PATENTS

| Number | Name | Date |
|---|---|---|
| 1,006,332 | Wilson | Oct. 17, 1911 |
| 1,006,923 | Du Pont | Oct. 24, 1911 |
| 1,679,604 | Cooke | Aug. 7, 1928 |
| 1,928,263 | Phillips | Sept. 26, 1933 |
| 2,247,406 | Raymond | July 1, 1941 |
| 2,316,507 | Dykeman | Apr. 13, 1943 |
| 2,474,974 | Fulton et al. | July 5, 1949 |

FOREIGN PATENTS

| Number | Country | Date |
|---|---|---|
| 41,910 | Denmark | Mar. 14, 1930 |